(12) United States Patent
Al Dibs et al.

(10) Patent No.: US 9,722,521 B2
(45) Date of Patent: Aug. 1, 2017

(54) DIGITAL CONTROL FOR A MICROELECTROMECHANICAL ELEMENT

(75) Inventors: Mohamad Iyad Al Dibs, Pfullingen (DE); Axel Wenzler, Reutlingen (DE); Oliver Krayl, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 903 days.

(21) Appl. No.: 13/988,457

(22) PCT Filed: Oct. 13, 2011

(86) PCT No.: PCT/EP2011/067854
§ 371 (c)(1),
(2), (4) Date: Jul. 23, 2013

(87) PCT Pub. No.: WO2012/069248
PCT Pub. Date: May 31, 2012

(65) Prior Publication Data
US 2013/0293161 A1 Nov. 7, 2013

(30) Foreign Application Priority Data

Nov. 23, 2010 (DE) ........................ 10 2010 061 790

(51) Int. Cl.
*H01L 41/04* (2006.01)
*H02P 13/00* (2006.01)
(Continued)

(52) U.S. Cl.
CPC ............. *H02P 13/00* (2013.01); *H02N 1/002* (2013.01); *G02B 26/0833* (2013.01)

(58) Field of Classification Search
CPC ..... G11B 7/246; G11B 7/2467; G11B 7/2472; G11B 7/2492; G11B 7/2494
See application file for complete search history.

(56) References Cited

U.S. PATENT DOCUMENTS 7,428,353 B1 9/2008 Milanovic et al.
9,176,521 B2 * 11/2015 Hammerschmidt .... G06F 1/025
(Continued)

FOREIGN PATENT DOCUMENTS

CN 1337087 A 2/2002
DE 10 2004 016 196 11/2005
(Continued)

OTHER PUBLICATIONS

International Search Report for PCT/EP2011/067854, dated Jan. 20, 2012.
(Continued)

*Primary Examiner* — Shawki S Ismail
*Assistant Examiner* — Zoheb Imtiaz
(74) *Attorney, Agent, or Firm* — Norton Rose Fulbright US LLP; Gerard Messina

(57) ABSTRACT

A control circuit for a microelectromechanical element includes: a waveform generator, which is designed to generate a digital trigger signal for the microelectromechanical element, a modulator, which is designed to oversample the digital trigger signal, to subject the signal to a noise shaping, and to output the oversampled and noise-shaped digital trigger signal; and a digital driver device, which is designed to drive the microelectromechanical element using the oversampled and noise-shaped digital trigger signal.

11 Claims, 4 Drawing Sheets

(51) Int. Cl.
*H02N 1/00* (2006.01)
*G02B 26/08* (2006.01)

(56) References Cited

U.S. PATENT DOCUMENTS

| | | | | |
|---|---|---|---|---|
| 2007/0164691 | A1* | 7/2007 | MacKay | H02P 6/182 318/1 |
| 2008/0042886 | A1* | 2/2008 | Li Puma | H03M 7/3022 341/143 |
| 2008/0122822 | A1 | 5/2008 | Pan et al. | |
| 2012/0076322 | A1* | 3/2012 | Kimura | H04R 19/016 381/94.9 |

FOREIGN PATENT DOCUMENTS

| | | |
|---|---|---|
| JP | 2004-361920 | 12/2004 |
| JP | 2005-63362 | 3/2005 |
| JP | 2010-327535 | 10/2010 |
| JP | 2010237535 A | 10/2010 |
| WO | WO 2007/135928 | 11/2007 |
| WO | WO 2010/007814 | 1/2010 |

OTHER PUBLICATIONS

Northemann, et al., "Drive and sense interface for gyroscopes based on bandpass sigma-delta modulators", IEEE International Symposium on Circuits and Systems, May 30-Jun. 2, 2010, pp. 3264-3267.

Northemann, et al., "A digital interface for gyroscopes controlling the primary and secondary mode using bandpass sigma-delta modulation", Sensors and Actuators, vol. 162, No. 2, Aug. 1, 2010, pp. 388-393.

Ricart, et al., "Control of MEMS Vibration Modes With Pulsed Digital Oscillators Part II: Simulation and Experimental Results", IEEE Transactions on Circuits and Systems I: Regular Papers, vol. 57, No. 8, Aug. 1, 2010, pp. 1879-1890.

Boser, et al., "Design of integrated MEMS", Jan. 1, 1996, pp. 207-232.

* cited by examiner

DIGITAL CONTROL FOR A MICROELECTROMECHANICAL ELEMENT

BACKGROUND OF THE INVENTION

1. Field of the Invention

The present invention relates to a control circuit for a digital trigger for a microelectromechanical element and a method for triggering a microelectromechanical element.

2. Description of the Related Art

Microelectromechanical systems (MEMS) are used today in micro system technology as converters of trigger signals into mechanical actions. Actuators play a major role here, in particular microelectromechanical actuators. One exemplary application involves the use of micromirror actuators (SLM, spatial light modulators) with the help of which a micromirror element or a micromirror array may be deflected in a targeted manner by rotation, tilting and shifting of light beams such as laser beams, for example.

Actuators require special and precise trigger signals to be able to ensure rapid, reproducible interference-free operation of the mechanical elements of the actuator. This makes high demands on the trigger circuits used for operation of an actuator, in particular because the space required for such triggers must remain small in the context of miniaturization of microelectromechanical components in order to keep production costs low.

Microelectromechanical elements may be operated resonantly or quasi-statically. A resonant type of operation requires operation of the microelectromechanical element on one or multiple modes of the microelectromechanical element. During quasi-static operation, however, the microelectromechanical element is also operated in frequency ranges outside of the resonant modes. It is important that preferably no frequency components of the trigger signal are in the modes during triggering since the electromechanical element might then temporarily be triggered in an unstable manner.

Triggering methods for microelectromechanical elements generally use linear drivers or digital drivers. Linear drivers may be embedded in an application-specific integrated circuit (ASIC). However, they require a relatively large area for the integration of the constituent components, such as operational amplifiers, controllers, voltage and current reference circuits, stabilization capacitors and similar components, for example. Furthermore, a digital-analog converter is needed, which may result in a complex and expensive overall system having a comparatively high energy demand.

Published German patent application document DE 10 2004 016 196 A1 describes a method for triggering an electromechanical system in which a linear driver circuit and a digital-analog converter are used.

Digital drivers usually have a simple design, are space-saving and resistant to interference. They are readily suitable for use during resonant operation. For use during quasi-static operation, however, interference components, which under some circumstances may have frequencies in the range of the resonant interference modes, must be taken into account. There is thus a demand for triggering of a microelectromechanical element using a digital driver which takes into account the aspects mentioned above.

BRIEF SUMMARY OF THE INVENTION

The underlying idea of the present invention is to create a method and a device for triggering a microelectromechanical element during quasi-static operation with the aid of which the microelectromechanical element may preferably be triggered without interference and which requires little implementation complexity.

A control circuit according to the present invention for a microelectromechanical element has a waveform generator, a modulator and a digital driver device. The waveform generator is designed to generate a digital trigger signal for the microelectromechanical element. The modulator is designed to oversample the digital trigger signal, to subject this signal to noise shaping and to output the oversampled and noise-shaped digital trigger signal. The digital driver device is designed to drive the microelectromechanical element using the oversampled and noise-shaped digital trigger signal. This triggering offers the advantage that conventional digital output stages may be used which may be accommodated in an integrated circuit in a simple and space-saving manner.

The modulator is preferably a delta-sigma modulator and the microelectromechanical element is a capacitive actuator, in particular a micromirror actuator. A high deflection precision of the actuator during quasi-static operation may therefore be achieved with little demands on the control drivers at the same time.

The zeros in the delta-sigma modulator may advantageously be set to frequencies of resonant modes of the microelectromechanical element, which permits a targeted suppression of noise components at frequencies of resonant modes of the microelectromechanical element.

A method according to the present invention for triggering a microelectromechanical element includes the steps:
providing a digital trigger signal having a signal frequency which is below a cutoff frequency ($\omega_g$) of the microelectromechanical element (30);
oversampling the digital trigger signal at a sampling frequency which is higher than twice the cutoff frequency ($\omega_g$);
noise shaping the oversampled digital trigger signal by shifting a noise which occurs during oversampling into a frequency range (23b) above the cutoff frequency ($\omega_g$); and
driving the microelectromechanical element (30) by using the oversampled digital trigger signal.

With the aid of this method it is possible to keep a desired signal band noise-free and in particular to effectively prevent the excitation of resonant modes of the microelectromechanical element during quasi-static operation.

The embodiments and refinements described above may, if meaningful, be arbitrarily combined with one another. Other possible embodiments, refinements and implementations of the present invention also include combinations of features of the present invention described above or below with respect to the exemplary embodiments, even if not mentioned explicitly.

DETAILED DESCRIPTION OF THE INVENTION

Figure 1:
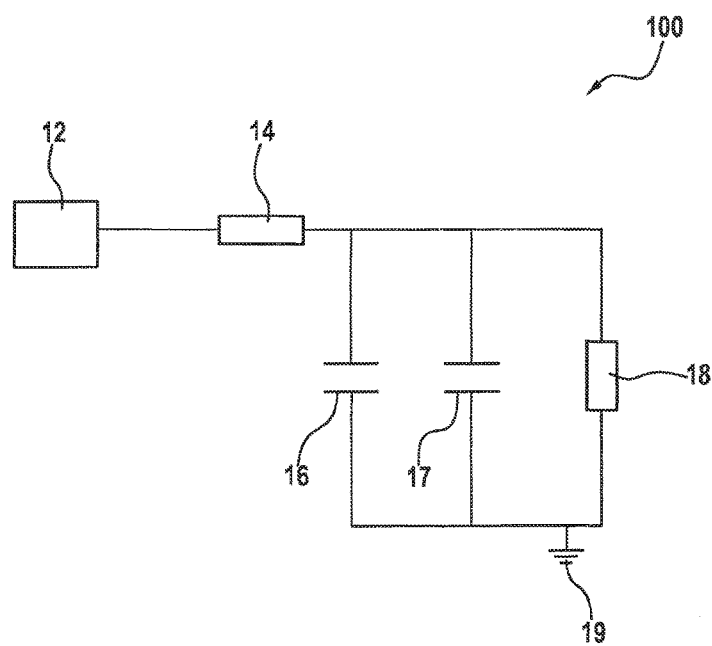
FIG. 1 shows an equivalent circuit diagram of a microelectromechanical actuator.

The same reference numerals are used in the figures of the drawings for the same elements, features and components and those having the same function, unless otherwise indicated. It is understood that components and elements in the drawings are not necessarily depicted to scale for reasons of clarity and comprehensibility.

Microelectromechanical elements in the sense of the present invention may include in particular microelectromechanical actuators. Actuators are triggered by a trigger signal to induce input signals into mechanical actions, in particular rotation, tilting and linear offsetting of connected mechanical components. One example of an actuator is a micromirror actuator, using which a micromirror may be rotated or moved along one or multiple axes of rotation, tilt or offset.

During linear triggering of microelectromechanical components, an attempt is made not to stimulate any resonant modes of the microelectromechanical element, i.e., to permit quasi-static operation.

FIG. 1 shows the equivalent circuit diagram of a microelectromechanical actuator 100. Microelectromechanical actuator 100 includes a first input resistor 14, which is connected in series with a parallel circuit of a first capacitor 16, a second capacitor 17 and a second resistor 18. A control signal, which is applied to an input 12 of microelectromechanical actuator 100, is initially conducted through input resistor 14, which generally has a low resistance and reflects all line resistances $R_{line}$ of actuator 100.

Capacitance C of actuator 100 may be divided into a first capacitance 16 and a second capacitance 17. First capacitance 16 is an effective capacitance $C_N$ of microelectromechanical actuator 100, and second capacitance 17 is a parasitic capacitance $C_P$ of microelectromechanical actuator 100. Effective capacitance $C_N$ of microelectromechanical actuator 100 is generally low in comparison with parasitic capacitance $C_P$ of microelectromechanical actuator 100. It is normally dynamic as a function of the mechanical condition of actuator 100.

The equivalent circuit diagram in FIG. 1 of microelectromechanical actuator 100 is characteristic of an inertial spring-mass system and is in first approximation a second-order low pass filter. A microelectromechanical actuator in the sense of the present invention therefore has a low-pass characteristic.

Figure 2:
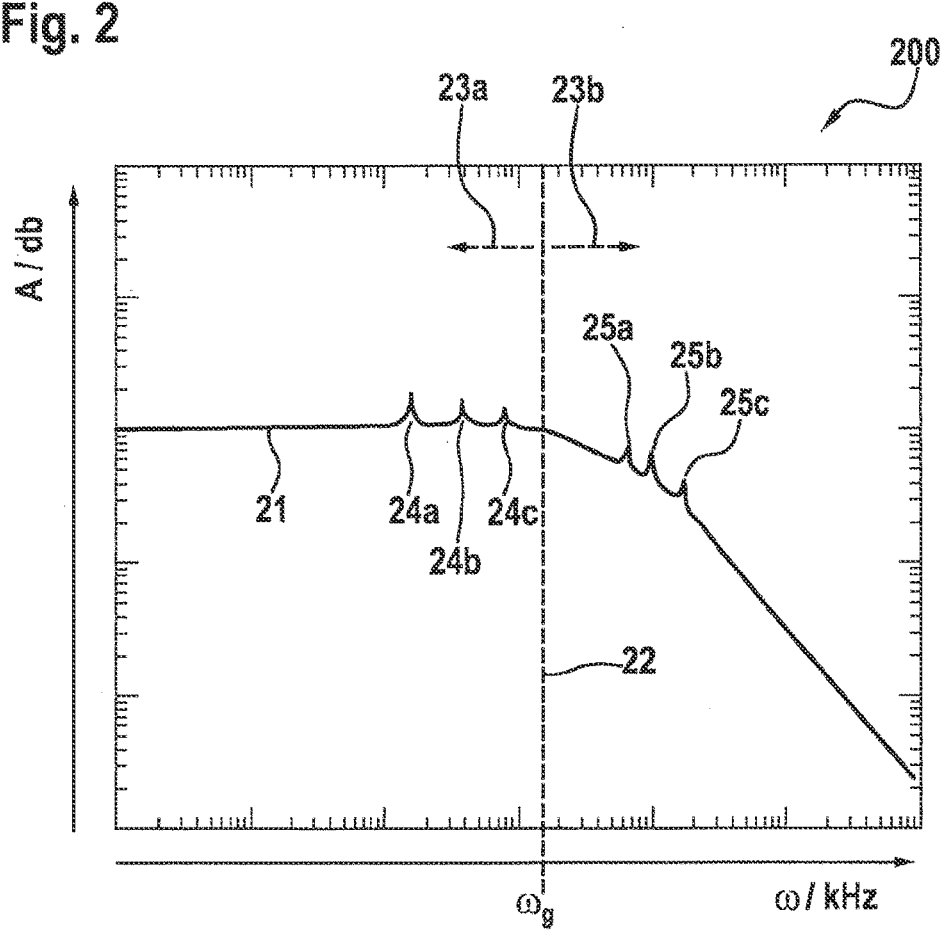
FIG. 2 shows a Bode diagram of the frequency response of a microelectromechanical actuator.

FIG. 2 shows frequency response 200 of a microelectromechanical actuator in the amplitude part of a Bode diagram. Frequency ω in kHz is plotted on the abscissa against the amplitude in dB on the ordinate. The frequency range of a microelectromechanical actuator may be divided into two ranges, each having two bandwidths.

Below a cutoff frequency $\omega_g$ 22, there is range 23a, which is indicated by the dashed-line arrow pointing to the left, which represents a useful range of the microelectromechanical actuator. In this useful range, the microelectromechanical actuator may be triggered quasi-statically in a frequency range 21 of the frequency response. Frequency range 21 is in particular not in frequency ranges having resonant modes of the microelectromechanical actuator. Three resonant modes 24a, 24b, 24c having an amplitude exaggeration in the frequency response are shown in FIG. 2 as an example. However, more or less resonant modes may occur, depending on the actuator. The resonant modes may occur at different frequencies within useful range 23a. Resonant modes 24a, 24b, 24c are very easily excitable and may result in an unstable triggering of the microelectromechanical actuator in the case of excitation due to the amplitude gain. It is therefore desirable for trigger signals for a microelectromechanical actuator to at no time have frequency components corresponding to the frequencies of resonant modes 24a, 24b, 24c during a quasi-static operation.

Range 23b indicated by the dashed-line arrow pointing to the right, which represents an attenuation-dominated range of the microelectromechanical actuator, is above cutoff frequency $\omega_g$ 22. In this range, the inertia of the microelectromechanical actuator, which is modeled as a spring-mass system according to FIG. 1, is dominant. Resonant modes 25a, 25b, 25c are also in this range, but these modes are highly attenuated due to the system inertia of the microelectromechanical actuator and therefore cannot easily be excited.

Figure 3:
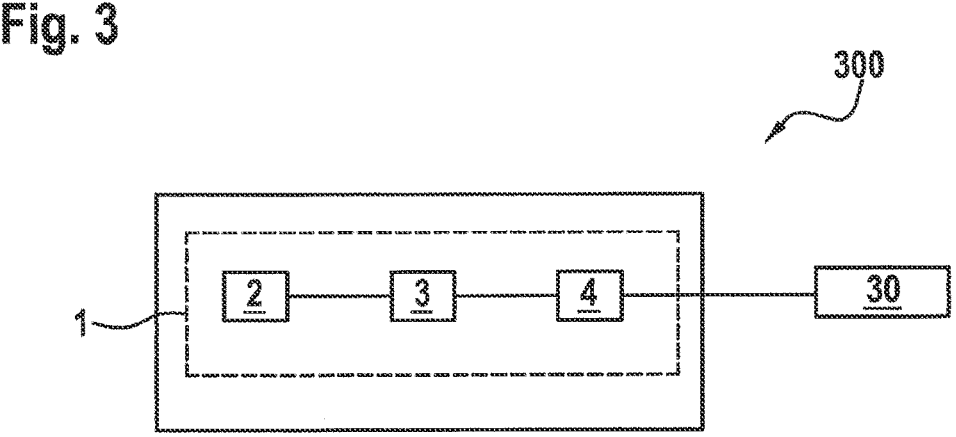
FIG. 3 shows a control circuit according to one specific embodiment of the present invention.

FIG. 3 shows a control circuit 300 for digital triggering of a microelectromechanical element 30 according to one specific embodiment of the present invention. Control circuit 300 includes a waveform generator 2, a modulator 3 and a digital driver device 4. Waveform generator 2, modulator 3 and the digital driver device may be situated in an integrated circuit 1 such as an ASIC chip or the like. Waveform generator 2 is connected to an input of modulator 3 whose output is in turn connected to an input of digital driver device 4. The output of digital driver device 4 is connected to a control input of microelectromechanical element 30.

Waveform generator 2 is designed to generate a digital trigger signal for microelectromechanical element 30. The digital trigger signal has one or multiple effective signal frequencies, which are in a useful range of microelectromechanical element 30, for example, in range 23a, which is shown in FIG. 2, in particular at frequencies in the range characterized by reference numeral 21.

These effective signal frequencies may be in a range between 10 Hz and 1 kHz, for example, in particular in a range between a few tens of Hz and a few hundreds of Hz. The effective signal frequencies are implemented so as not to coincide with frequencies of resonant modes of microelectromechanical element 30; for example, they do not coincide with resonant modes 24a, 24b, 24c, as shown in FIG. 2.

The digital trigger signal may be generated on integrated circuit 1, for example. However, it may also be provided to read out the digital trigger signal from a memory on the integrated circuit, the memory containing a plurality of predefined trigger signals, each of the predefined trigger signals being loaded out of the memory to trigger microelectromechanical element 30.

Modulator 3 is designed to oversample the digital trigger signal, to subject the signal to noise shaping and to output the oversampled and noise-shaped digital trigger signal to digital driver device 4. Modulator 3 may be a delta-sigma modulator in particular.

A delta-sigma modulator has two properties, which may advantageously be used for implementation of the desired signal shaping of the digital trigger signal.

First, a delta-sigma modulator operates at a high oversampling rate. The high oversampling rate may have a sampling frequency at least twice as high as cutoff frequency $\omega_g$ of microelectromechanical element 30. Quantization noise which occurs during quantization of the digital trigger signal by modulator 3 is distributed uniformly over a frequency range from zero frequency to half of the sampling frequency. The total noise energy, distributed over the frequency range, remains constant. Thus, the higher the sampling frequency, the larger is the frequency range in which the quantization noise is distributed and the higher is the signal-to-noise ratio for each individual frequency within this frequency range.

Range 23a in FIG. 2 is the useful range of microelectromechanical element 30, which plays a role for the quantization noise. The relative component of the quantization noise declines with an increase in the sampling frequency of modulator 3 within range 23a in comparison with the entire frequency range over which the quantization noise is distributed. The signal-to-noise ratio in the relevant useful range of microelectromechanical element 30 may therefore be kept high by a sampling frequency during oversampling of the digital trigger signal. In the range of resonant modes 24a, 24b, 24c in particular, the signal-to-noise ratio is thus also high, i.e., the component of interference and noise signals at the frequencies of the resonant modes is low during triggering of microelectromechanical element 30 during quasi-static operation, and triggering of microelectromechanical element 30 is stable. Doubling of the sampling frequency of modulator 3 results in a reduction of approximately 3 dB in the noise level in the useful range of microelectromechanical element 30.

Second, noise shaping is carried out using a delta-sigma modulator. Noise shaping refers to a method in which the quantization noise of a digital signal is concentrated to a greater extent in certain frequency ranges, and therefore there is a shift in the noise energy in the frequency spectrum. Noise signals of the quantization noise may therefore be shifted into a frequency range 23b above cutoff frequency $\omega_g$ by using a delta-sigma modulator. In this range 23b, the inertia of microelectromechanical element 30 is dominant, so that according to the transfer function shown in FIG. 2, noise signals in this frequency range are filtered due to the inherent low-pass properties of microelectromechanical element 30.

The extent of the noise shaping depends on the sampling frequency and the order of the delta-sigma modulator, for example. The shift of the quantization noise into second range 23b may thus be achieved, depending on the choice of the modulator parameters.

A delta-sigma modulator has at least one integrator having a signal transfer function in its forward path, depending on the order. This signal transfer function has one or multiple zeros. The noise signal transfer function of the delta-sigma modulator may be set to zero at these zeros via the selection of the signal transfer function of the integrator and the corresponding selection of the zeros. Quantization noise in the output signal of the delta-sigma modulator is thus suppressed at frequencies corresponding to the zeros.

The present invention makes use of this relationship in an advantageous manner in that an integrator of the delta-sigma modulator may have a zero of its transfer function at the frequency of a resonant mode of microelectromechanical element 30. A noise signal having a frequency component at a frequency of the corresponding resonant mode of microelectromechanical element 30 is thus effectively suppressed, and triggering of microelectromechanical element 30 is thus stable during quasi-static operation.

The output signal of modulator 3 is fed into a driver device, which uses it to drive microelectromechanical element 30. The trigger signal advantageously has extremely reduced frequency components or none at all at frequencies of resonant modes 24a, 24b, 24c of useful range 23a of microelectromechanical element 30 for driving microelectromechanical element 30, so that stable triggering during quasi-static operation may be ensured.

Figure 4:
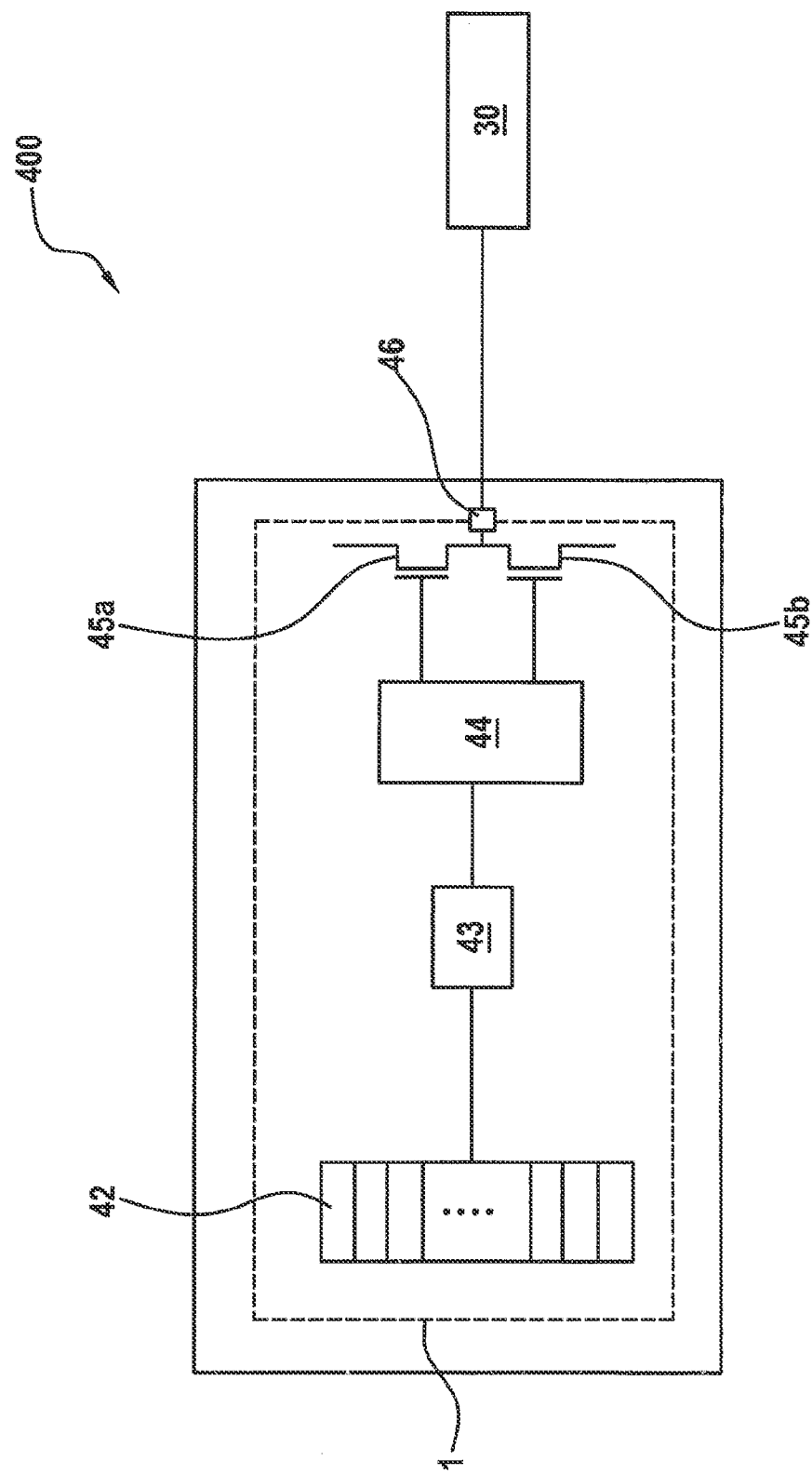
FIG. 4 shows a control circuit according to another specific embodiment of the present invention.

FIG. 4 shows a control circuit 400 according to another specific embodiment of the present invention. Control circuit 400 may be an exemplary specific embodiment of control circuit 300 in particular. Control circuit 400 includes a lookup table 42 having N bits from which trigger waveforms for digital triggering of a microelectromechanical element 30 may be provided. Control circuit 400 also includes a delta-sigma modulator 43, which receives a digital trigger signal from lookup table 42 and outputs an oversampled and noise-shaped digital trigger signal. The oversampled and noise-shaped digital trigger signal is received by a gate driver 44, which triggers two transistors 45a and 45b, which are MOSFETs in particular, according to the trigger signal. A driver signal is fed into microelectromechanical element 30 via a connection 46 on an ASIC chip on which lookup table 42, delta-sigma modulator 43, gate driver 44 and transistors 45a and 45b may be situated.

Figure 5:
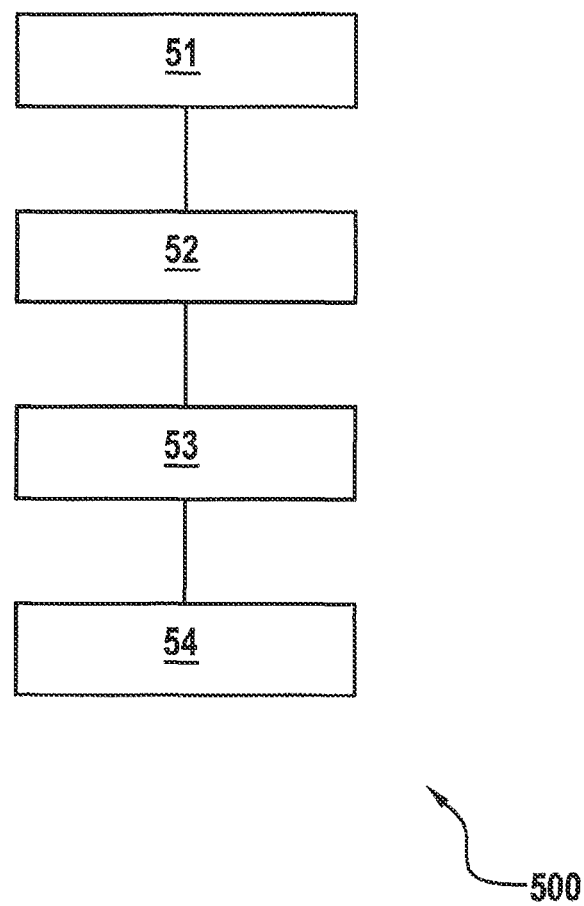
FIG. 5 shows a method for triggering a microelectromechanical element according to another specific embodiment of the present invention.

FIG. 5 shows a schematic diagram of a method 500 for triggering a microelectromechanical element.

In a first step 51 of method 500, a digital trigger signal having a signal frequency below a cutoff frequency $\omega_g$ of microelectromechanical element 30 is provided.

In a second step 52, the digital trigger signal is oversampled at a sampling frequency greater than twice the cutoff frequency $\omega_g$. This oversampling may take place using a delta-sigma modulator as described above with reference to FIG. 3.

In a third step 53, the oversampled digital trigger signal is noise shaped by shifting a noise which occurs during oversampling to a frequency range above cutoff frequency $\omega_g$. This noise shaping may take place using a delta-sigma modulator as described above with reference to FIG. 3.

In a fourth step 54, microelectromechanical element 30 is driven by the oversampled digital trigger signal. Method 500 may be used in particular for driving a capacitive actuator, in particular a micromirror actuator during quasi-static operation.

What is claimed is:

1. A method for triggering a microelectromechanical element, comprising: providing a digital trigger signal at a signal frequency which is below a predetermined cutoff frequency of an equivalent circuit of the microelectromechanical element, wherein the equivalent circuit includes a first input resistor, a first capacitor, a second capacitor, and a second resistor; oversampling the digital trigger signal at a sampling frequency which is higher than twice the predetermined cutoff frequency; noise-shaping of the oversampled digital trigger signal by shifting a noise which occurs during the oversampling to a frequency range above the predetermined cutoff frequency; and driving the microelectromechanical element using the oversampled digital trigger signal, wherein the trigger signal does not have, at any time, frequency components corresponding to frequencies of a resonant mode of the microelectromechanical element.

2. The method as recited in claim 1, wherein the steps of oversampling and noise-shaping are carried out using a delta-sigma modulator.

3. The method as recited in claim 2, wherein a zero of a transfer function of an integrator of the delta-sigma modulator is set to a frequency of a resonant mode of the microelectromechanical element in a frequency range below the predetermined cutoff frequency.

4. A control circuit for a microelectromechanical element; comprising: a waveform generator configured to generate a digital trigger signal for the microelectromechanical element at a signal frequency which is below a predetermined cutoff frequency of an equivalent circuit of the microelectromechanical element, wherein the equivalent circuit includes a first input resistor, a first capacitor, a second capacitor, and a second resistor; a modulator configured to (i) oversample the digital trigger signal at a sampling frequency which is higher than twice the predetermined cutoff frequency the digital trigger signal, (ii) noise-shape the oversampled digital trigger signal by shifting a noise which occurs during the oversampling to a frequency range above the predetermined cutoff frequency, and (iii) output the oversampled and noise-shaped digital trigger signal; and a digital driver device configured to drive the microelectromechanical element using the oversampled and noise-shaped digital trigger signal during quasi-static operation, wherein the trigger signal does not have, at any time, frequency components corresponding to frequencies of a resonant mode of the microelectromechanical element.

5. The control circuit as recited in claim 4, wherein the modulator is a delta-sigma modulator.

6. The control circuit as recited in claim 5, wherein the microelectromechanical element is a capacitive actuator.

7. The control circuit as recited in claim 6, wherein a zero of a transfer function of an integrator of the delta-sigma modulator is set to a frequency of a resonant mode of the microelectromechanical element in a frequency range below the predetermined cutoff frequency.

8. The method of claim 1, wherein the frequency range which is below the predetermined cutoff frequency represents a useful range of the microelectromechanical element.

9. The control circuit as recited in claim 4, wherein the frequency range which is below the predetermined frequency represents a useful range of the microelectromechanical element.

10. The method of claim 1, wherein the frequency range above the predetermined cutoff frequency represents an attenuation-dominated range of the micromechanical element.

11. The control circuit as recited in claim 4, wherein the frequency range above the predetermined cutoff frequency represents an attenuation-dominated range of the micromechanical element.

* * * * *